United States Patent [19]

Brunner et al.

[11] 4,198,677

[45] Apr. 15, 1980

[54] METHOD AND APPARATUS FOR COMPENSATING A SENSOR

[75] Inventors: Stanley N. Brunner, Downingtown; George S. Bartley, Harleysville, both of Pa.

[73] Assignee: Exxon Research & Engineering Co., Florham Park, N.J.

[21] Appl. No.: 873,596

[22] Filed: Jan. 30, 1978

[51] Int. Cl.² .............................................. G05B 1/00
[52] U.S. Cl. .............................. 364/571; 340/347 CC; 324/130
[58] Field of Search ....................... 364/571, 556, 602; 340/347 CC; 324/130

[56] References Cited

U.S. PATENT DOCUMENTS

| | | | |
|---|---|---|---|
| 3,673,392 | 6/1972 | Holm | 364/602 |
| 3,811,125 | 5/1974 | Schumann | 340/347 M |
| 3,824,588 | 7/1974 | Vermillion | 324/130 |
| 3,878,373 | 4/1975 | Blum | 364/571 |
| 3,940,597 | 2/1976 | DiMatteo | 364/571 |
| 4,014,023 | 3/1977 | Kirkland | 340/347 M |
| 4,031,630 | 6/1977 | Fowler | 364/571 |
| 4,043,756 | 8/1977 | Sommervold | 364/571 |
| 4,088,951 | 5/1978 | Fletcher et al. | 324/130 |
| 4,099,240 | 7/1978 | Rode et al. | 364/571 |

Primary Examiner—Malcolm A. Morrison
Assistant Examiner—Gary Chin
Attorney, Agent, or Firm—Norman L. Norris

[57] ABSTRACT

A sensor is compensated through the use of a closed loop comprising a digital processor, a digital-to-analog converter and a comparator having inputs coupled to the converter and the sensor and an output fed back to the digital processor. During calibration of the sensor, a signal from the sensor is tracked by the digital processor and at least one of the values characteristic of the sensor signal is stored in the digital processor. The stored value is used as or in the computation of a reference by the digital processor which is compared with the sensor signal during operation of the sensor to appropriately compensate the sensor for gain, offset, drift or degradation in the quality of the sensor signal.

8 Claims, 6 Drawing Figures

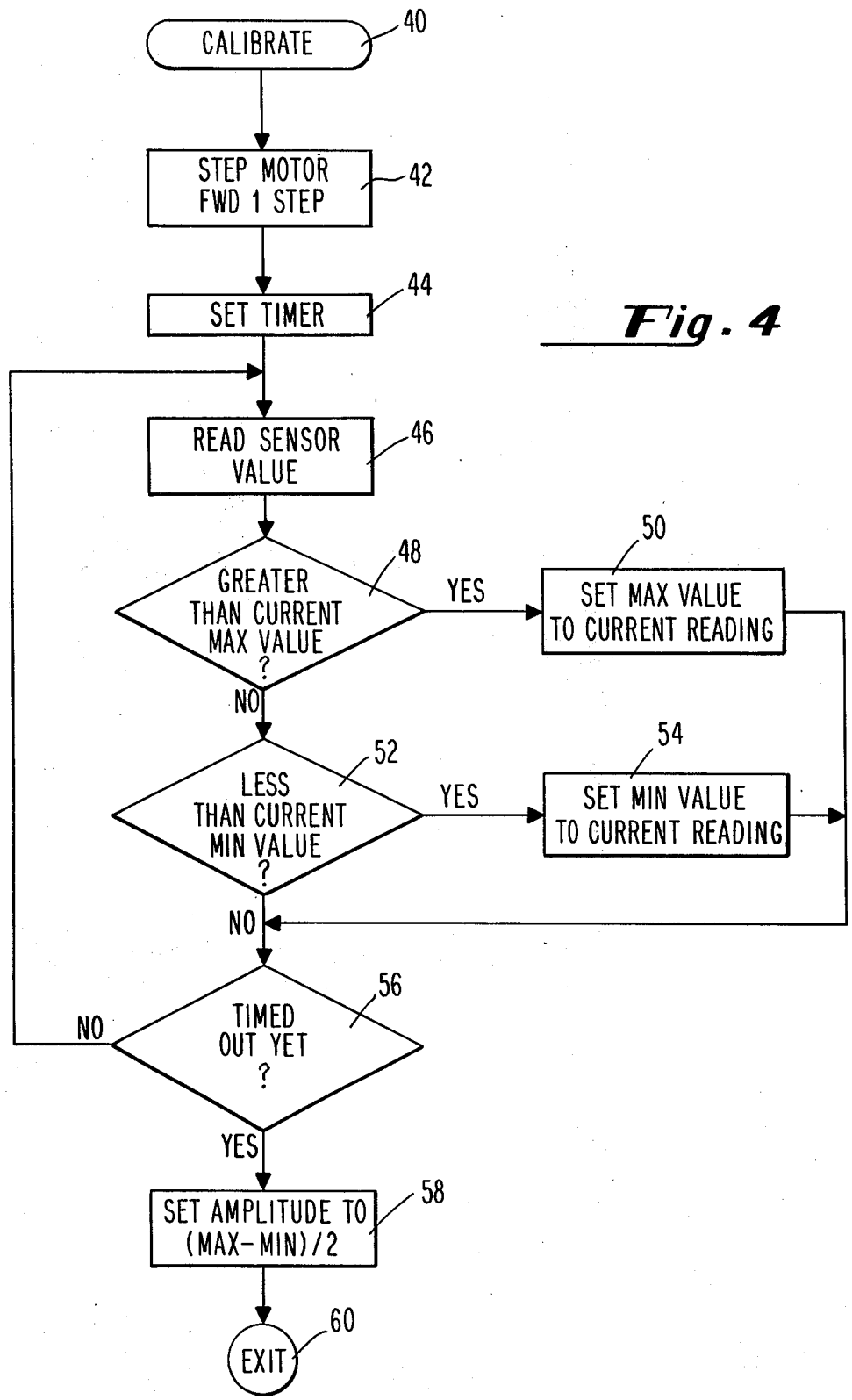

METHOD AND APPARATUS FOR COMPENSATING A SENSOR

BACKGROUND OF THE INVENTION

This invention relates to the use of a digital processor or computer for compensation of sensors.

A wide variety of sensors are utilized for different purposes including the control of processes and equipment. When utilizing sensors for control purposes, it is particularly important, in many instances, to avoid gain, offset, drift and degradation problems which can produce unreliability.

In the area of optical sensors, an LED (light emitting diode)/phototransistor combination is widely used in a variety of applications. One distinct advantage of this combination is the relatively low cost. However, the gain and offset of the combination differ from one LED/phototransistor to another LED/phototransistor, and the LED and phototransistor are subject to short term drift with temperature as well as long term degradation. Although such a combination may be utilized in certain digital applications, the combination is generally unsuitable for analog applications. Some of the foregoing difficulties may be eliminated by AC coupling the LED to the phototransistor. However, variations in gain still present a problem. Moreover, the AC coupled combination results in a relatively high cost. Another optical combination which is sometimes utilized comprises a sensor, a reference, a comparator and a uniform light source. A photocell may be utilized in conjunction with the uniform light source as the reference and the sensor itself may comprise a phototransistor. Although gain, offset, short and long term drift are minimized, such a combination is quite costly and therefore unsuitable for many applications.

SUMMARY OF THE INVENTION

It is an object of this invention to provide a method and apparatus which will permit the use of a sensor in a variety of applications even though the sensor is characterized by short or long term drift.

It is a further object of this invention to provide a method and apparatus which will permit the use of sensors which may vary in gain and/or offset.

It is a further object of this invention to provide a method and apparatus so as to permit the use of relatively low cost sensors.

In accordance with these and other objects of this invention, a digital processor which may comprise a microprocessor or a larger scale processor is utilized in combination with a digital-to-analog converter and a comparator. The comparator includes a first input coupled to the output of the converter and a second input coupled to a sensor producing an analog signal. The output of the comparator is then applied as feedback to the digital processing unit. During the calibration phase, the digital processor iteratively produces digital output values which are converted and coupled to the comparator for comparison with the instantaneous value of the analog sensor signal. As the analog sensor signal is tracked by iteratively producing other digital values corresponding to other instantaneous values of the analog sensor signal, at least one of the digital values characteristic of the analog sensor signal is stored. The stored digital value characteristic of the analog sensor signal may then be utilized directly or in the computation of a reference signal for comparison with the analog sensor signal so as to appropriately compensate the sensor for subsequent operation after calibration.

In a particularly preferred embodiment of the invention, the analog sensor signal is substantially sinusoidal and the digital values which are stored in the digital processor during calibration represent the maximum and minimum. The digital value for purposes of establishing a reference are then computed in accordance with the formula $$\frac{(\text{maximum} - \text{minimum})}{2} \sin D + \frac{(\text{maximum} + \text{minimum})}{2}$$

where D equals the angle of the sinusoidal signal corresponding to the stored digital value.

BRIEF DESCRIPTION OF THE DRAWINGS

FIG. 4 is a flow diagram of the calibration phase performed by the processor of FIG. 1.

DETAILED DESCRIPTION OF A PREFERRED EMBODIMENT

Figure 1:
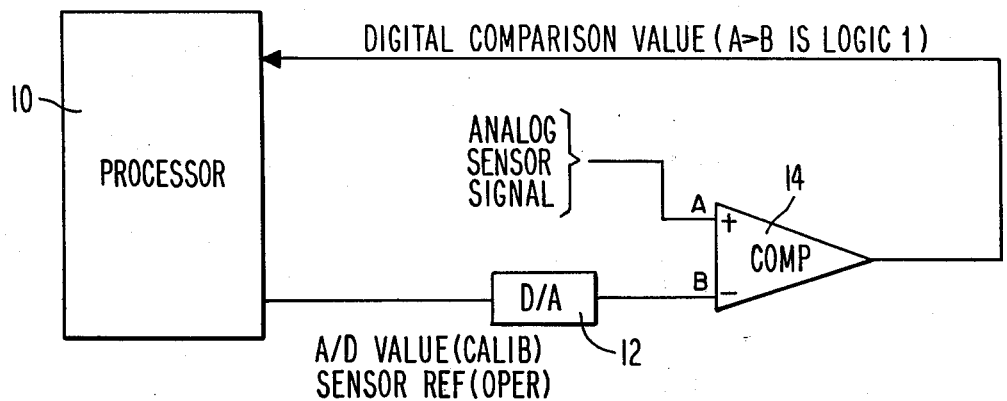
FIG. 1 is a block diagram of apparatus utilized in a preferred embodiment of the invention.

As shown in FIG. 1, a closed loop including a digital processor 10 is utilized to provide compensation of an analog sensor. The loop includes a digital-to-analog converter 12 and a comparator 14 having a first input A coupled to the analog sensor and a second input B coupled to the output of the digital-to-analog converter 12. The output of the comparator is applied as a digital or binary signal (1 or 0) to the processor 10.

During the calibration phase of operation, the analog sensor signal applied to the input A of the comparator 14 is tracked by digital values produced by the processor 10 and applied to the converter 12. For each instantaneous value of the analog sensor signal at the input A, the processor 10 iteratively produces a plurality of digital values until the output of the comparator 14 indicates that the digital value as converted and applied to the input B is equal to or corresponds with the analog sensor signal as applied to the input A. The same process is repeated for subsequent instantaneous analog sensor signal values characteristic of the analog sensor signal which are stored in the processor 10 during the calibration phase so as to permit the subsequent use of that characteristic value as a sensor reference to be converted by the converter 12 and applied to the input B during the operation mode thereby providing for an appropriately compensated analog sensor. It will of course be appreciated that the step of calibration may be repeated many times and frequently so as to assure that the analog sensor is always appropriately compensated regardless of short term or long term drift.

Figure 3:
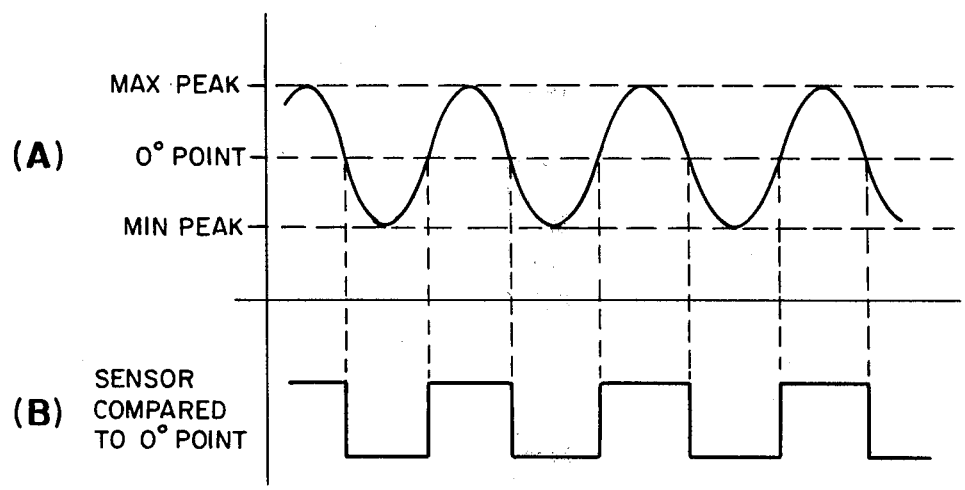
FIG. 3A is a waveform representing the analog sensor signal applied to the comparator of FIG. 1.
FIG. 3B is a waveform representing the output of the comparator of FIG. 1.

In a particularly preferred embodiment of the invention, the analog sensor signal may be sinusoidal as shown in FIG. 3A. In that case, it is desirable to store during calibration the maximum and minimum values which may then be utilized to compute any of a number of reference digital values for comparison with the analog sensor signal in the operating mode.

Figure 2:
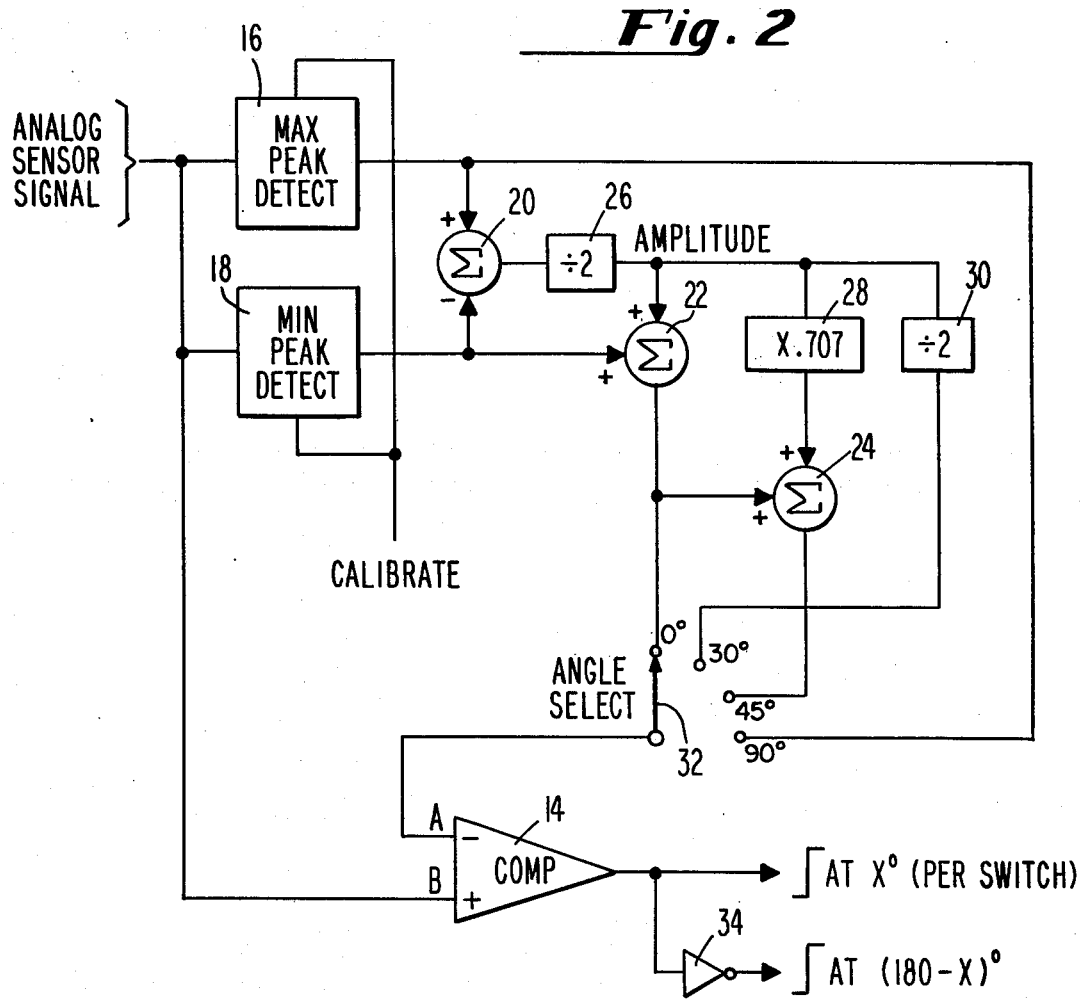
FIG. 2 is a block diagram of an analog equivalent for the computation performed by the processor of FIG. 1.

The nature of the computations which are performed by the processor 10 are depicted in analog equivalent form in the diagram of FIG. 2. After the maximum and minimum values of the analog sensor signals have been detected by a maximum peak detector 16 and a minimum peak detector 18 as shown in FIG. 2, the outputs from the detectors 16 and 18 are utilized by summers 20, 22 and 24 and constant networks 26, 28 and 30 so as to produce analog values at the A input to the comparator 14 which correspond to 0°, 30°, 45° or 90° on the sinusoidal signal depending upon the position of the angle select switch 32. The values at the switch 32 are applied to the comparator 14 for comparison with the analog signal during the operating mode. The output from the comparator corresponds with the position of the switch angle (X°) or (180°−X°) at the output of an inverter 34.

From the foregoing, it will be understood that the various computation functions which are performed on an iterative basis by the processor 10 may therefore be performed by an analog computer circuit as shown in FIG. 2. However, considerably more flexibility is afforded by the processor 10. Moreover, the advent of the microprocessor permits the compensation of the sensor as disclosed in FIG. 1 to be provided at relatively low cost consistent with one important objective of this invention.

Where the angle select switch 32 in the position shown in FIG. 2, the analog sensor signal is compared with the value of the sinusoidal signal of FIG. 3A at 0° or (180°−0°). Utilizing the 0° point and the 180° point as the reference produces a square wave logic signal at the output of the comparator during the operate mode as shown in FIG. 3B where transitions occur at the 0° and 180° points on the analog sensor signal.

As mentioned previously, the analog sensor signal is tracked during the calibration mode as will now be described with reference to the flow diagram of FIG. 4. In the flow diagram of FIG. 4, it is assumed that an analog sensor of the type disclosed in U.S. Pat. No. 4,137,491, assigned to the assignee of this invention, is utilized in connection with the control of a stepper motor as disclosed therein and incorporated herein by reference as if set forth in full. The sinusoidal signal produced by that sensor as shown in the waveform of FIG. 3A is produced as a result of stepping the motor.

Upon initiating calibration (40), the step motor of the system is moved one step forward (42) which sets a timer (44). A loop is then entered in which the instantaneous sensor value is read (46). The reading of the sensor value is accomplished by iteratively producing digital values until the comparator output as shown in FIG. 1 produces a logic 1. If the instantaneous analog sensor value is greater than the heretofore stored current maximum value (48), a new maximum value (50) is set to the current instantaneous value. On the other hand, if the instantaneous value is less than the current minimum value stored (52), a new minimum value is set in accordance with the current reading (54). If after the setting of the maximum or minimum values (50) and (54), the timer has not yet timed out (56), the loop is repeated. If the timer has timed out, the maximum and minimum values which have been set and stored are then utilized to set and store the amplitude of the analog sensor value at the maximum minus the minimum value divided by 2 (58) and the processor exits from the calibration mode (60).

Figure 5:
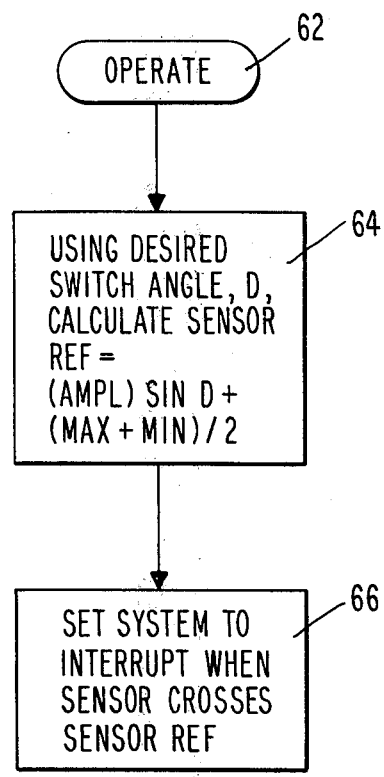
FIG. 5 is a flow diagram of the computation and use of reference values generated by the processor of FIG. 1.

Referring now to FIG. 5, the processor may enter the operate mode (62) in which the appropriate reference signal is generated in accordance with the equation:

$$\text{Ref.} = \frac{(\text{maximum} - \text{minimum})}{2} \sin D + \frac{(\text{maximum} + \text{minimum})}{2}$$

where D is the reference point on the sinusoidal waveform of FIG. 3A corresponding to the angle of the switch 32 of FIG. 2. The output of the comparator 14 changes state whenever the sensor reference signal and the sensor signal are equal (66).

As noted previously, the processor during the calibration mode will produce iterative digital values until correspondence or equality is achieved between the sensor signal and the digital value as converted by the converter 12 as shown in FIG. 1. The processor may be programmed in different ways to iteratively produce the digital values. For example, the digital value produced at the output of the processor may be continuously incremented until equality or correspondence is achieved. In the alternative, the technique of successive approximations may be utilized to shorten the search for the corresponding digital value. Of course, the processor 10 may be programmed in other ways to allow the digital values from the processor to track the analog sensor signal.

The Fairchild F-8 microprocessor is particularly well-suited for use in practicing the invention. However, the processor may be of various types and sizes.

In the aforesaid U.S. Pat. No. 4,137,491, the particular sensor comprises a light emitting diode in combination with a phototransistor. As mentioned previously, such a combination is relatively low cost and the use of the apparatus and method disclosed herein permit the low cost combination to be utilized without any trade-off with respect to drift and degradation or variations in gain and offset. It will of course be appreciated that other sensors may be utilized and the invention is not limited to the use of any particular type of sensor. Moreover, the invention is not limited to the use of the method and apparatus disclosed herein with respect to any particular application although the invention has been found to be extremely useful in a control of stepper motors as disclosed in the aforesaid copending application.

Although a particular embodiment of the invention has been shown and described and various modifications have been suggested, it will be understood that the invention may be incorporated in various embodiments and modifications without departing from the true spirit and scope of the invention as set forth in the appended claims.

What is claimed is:

1. The method of using a sensor producing an analog signal with a processing means comprising the following calibration steps:
    converting a digital output value from said processing means to an analog signal value;
    comparing the sensed analog signal value with the converted digital output value;
    changing the digital output value of said processing means in the absence of a predetermined relationship between the analog signal value and the converted digital output value;

reiterating the foregoing steps until a predetermined relationship exists between the analog signal value and the digital output value;

repeating the foregoing steps for different instantaneous analog signal values; and storing at least one of said digital output values having said predetermined relationship in said processing means so as to represent a selected characteristic of said analog signal;

said method further comprising the following measuring steps:

generating a sensor calibrated digital output value at the output of said processing means from said at least one of said stored digital output values;

converting said sensor calibrated digital output value to a calibrated analog signal value comparing the calibrated analog signal value to said analog signal.

2. The method of claim 1 including the further calibration step of computing at least one sensor calibrated digital output value from said at least one stored digital output value.

3. The method of claim 1 wherein the analog signal is substantially sinusoidal.

4. The method of claim 3 wherein the stored digital values comprise the maximum and minimum of the sinusoidal signal.

5. The method of claim 4 including the step of computing at least one value representing $$\frac{(\text{maximum} - \text{minimum})}{2} \sin D + \frac{(\text{maximum} + \text{minimum})}{2}$$

where D=the angle of said sinusoidal signal corresponding to said stored digital value.

6. Apparatus for compensating a sensor comprising:

digital processing means;

digital-to-analog converter means;

comparator means having a first input coupled to the output of said converter means, a second input adapted to be coupled to said sensor, and an output coupled to said processing means to form a closed loop;

said digital processing means iteratively computing digital output values and coupling said iteratively computed digital values to said converter means, said computing continuing until at least one of said iteratively computed digital values as converted corresponds with an instantaneous sensor output as determined by the output of said comparator, said digital processing means iteratively producing other digital values corresponding to other instantaneous values of said sensor output and storing at least one of said digital values corresponding to a selected characteristic of said sensor, said digital processing means generating a sensor calibrated digital output value from said at least one of said digital values corresponding to a selected characteristic of said sensor;

said converter means converting said sensor calibrated digital output value to a calibrated analog signal value; and said comparator comparing the calibrated analog signal value to said sensor output.

7. The apparatus of claim 6 wherein said digital processing means computes at least one digital value from said at least one stored digital value to generate said sensor calibrated digital output value.

8. The apparatus of claim 6 wherein said stored value is compared with the output of said sensor after conversion by said converter means.

* * * * *